UNITED STATES PATENT OFFICE.

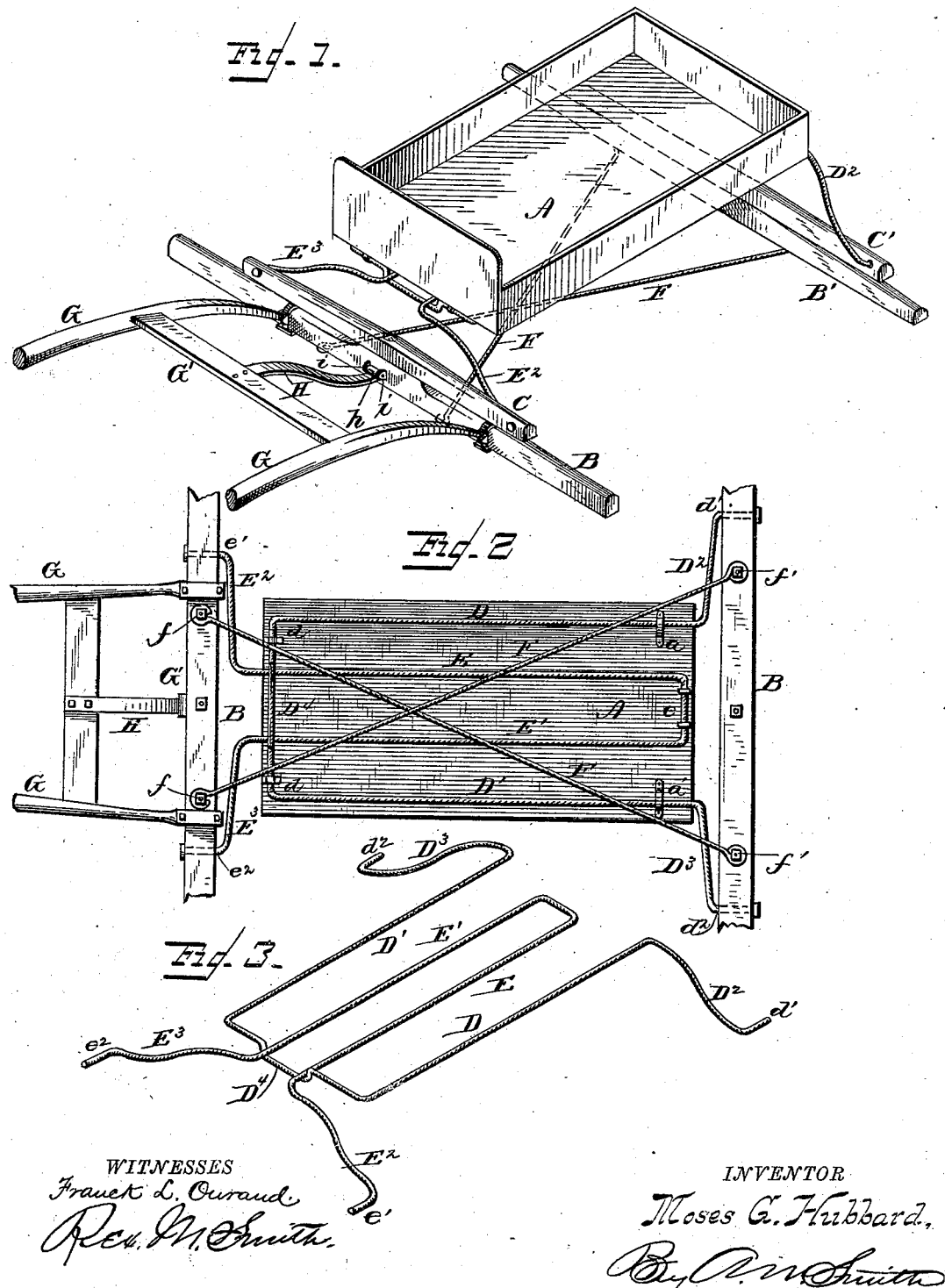

MOSES G. HUBBARD, OF NORRISTOWN, PENNSYLVANIA.

ROAD-WAGON.

SPECIFICATION forming part of Letters Patent No. 295,011, dated March 11, 1884.

Application filed November 23, 1883. (No model.)

*To all whom it may concern:*

Be it known that I, MOSES G. HUBBARD, of Norristown, county of Montgomery, State of Pennsylvania, have invented a new and useful Improvement in Road-Wagons, of which the following is a full, clear, and exact description, reference being had to the accompanying drawings, making part of this specification.

My invention relates to combined torsion-springs and perch for road-wagons, and to the combination therewith of a supplemental cross-perch; also, to a novel arrangement of spring-coupling between the forward axle and the thill or draft attachment for preventing rattling in the connection of the latter with the wagon, and for affording additional security against accidental detachment of the thills, as hereinafter explained.

In the accompanying drawings, Figure 1 is a perspective view of so much of a road-wagon as is necessary to show my improvement. Fig. 2 is a bottom view of the same, and Fig. 3 is a perspective view of the combined torsion-springs and perch detached.

A represents the body of the wagon, B B' the axles, and C C' the bolsters, pivoted centrally to the axles, said parts being of any usual or preferred form.

To the bottom of the body of the portion A are secured the torsion rods or springs D D' and E E', which may each be made in a single piece in the loop form, and provided at the open end of the loop each with the outwardly or laterally projecting crank arms or levers, through which connection is made with the axle or axle-bolsters, as shown. When this construction is employed, the transverse portion $D^2$ of the connecting-rods D and D', where it crosses the rods E and E', is bent into the form of a pendent loop, $d$, through which the rods E and E' pass, said loop $D^4$ serving to permit and steady the lateral movements of said rods. The torsion rods or springs D and D' may, however, be made separate, so as not to cross the rods E and E', in which case a separate loop bracket or brackets—such as are shown at $a$ and $a'$—will be required to steady and limit the lateral play of the rods E and E'. These loop-brackets permit the lateral play of the ends of the rods, which are connected by the lever-arms with the bolsters, due to the yielding or springing of the levers or arms. The transverse portions of the rods indicated at $d\ d$ and $e$ are rigidly secured to the body of the wagon for preventing rocking movement of the rods D D' and E E' at the ends thus secured, and at all points in their length, except such as is due to the torsional strain exerted on them, the former through the crank arms or levers $D^2\ D^3$, connecting their rear ends with the rear axle or bolster, and the latter through similar arms or levers, $E^2$ and $E^3$, connecting the rods E and E' with the forward bolster. The arms or levers $D^2$, $D^3$, $E^2$, and $E^3$ terminate each in a crank wrist or pin, $d'$, $d^2$, $e'$, or $e^2$, arranged at right angles, or nearly so, to said arms, and passing through perforations in the bolsters, where they are secured by means of nuts on their threaded ends, or in other suitable manner. The perforations for the reception of said crank-wrists, if desired, may be provided with suitable thimbles for the reception of said wrists, and for preventing wear of the bolster. By the arrangement of the torsion rods or springs as described, with the rods D and D' rigidly secured to the body of the wagon at or near its forward end, and extending to and connected with the rear axle, and with the rods E and E' rigidly secured to said body at or near its rear end, and extending thence to the forward axle, it will be seen that said rods are made not only to serve as torsion-springs, but they also serve the function of a perch, connecting the two axles. The bolsters are, however, made of elastic material, to prevent their allowing the axles to be sprung or forced apart by the slight lengthening and shortening of the torsion-springs and arms in the upward and downward movement.

To facilitate turning, I prefer to employ an auxiliary perch, made in the form of two rods or bars, F and F', pivoted at their ends to bolts or pins $f$ and $f'$ on the axles, and crossing each other at a point forward of the center of their length, whereby the forward ends are brought considerably nearer to each other and to the center of the length of the axle than the rear ends. By this arrangement not only is the slight springing apart of the axles consequent upon the action of the torsion-spring arms prevented, but a greater throw of movement of the forward axle upon its pivotal connection with its bolster is given in turning the vehicle than to the rear axle, which is desirable, although the swiveling of the rear axle also serves to facilitate the turning of the vehicle. When the distance between the points of attachment of the perches on the front axle bears the same proportion to the distance between their points of attachment on the rear axle that the size of the front wheels bears to the size of the rear wheels, the best result is attained.

The thills (indicated at G G) are connected with the forward axle by means of eyes, clips, and bolts, of any usual or preferred construction; but to prevent the disagreeable rattling due to said parts being roughly or loosely put together or to wear, I employ a spring, H, rigidly connected at its forward end with the cross-bar G' of the thills, and provided at its rear end with an eye, h, through which it is connected by a pin or bolt with a clip or eyes, i i on the forward axle, B, near the center of its length, and in the same transverse line with the pivotal connections of the thills with the said axle. This spring is so formed that its rear end has to be pressed downward to bring it into position to be connected with the axle, and when so connected its tension is exerted to press downward upon the thills and to hold them firmly down upon the pivotal pins, connecting them with the clips, and hold said pins firmly down in the eyes or perforations in the clip, and thereby to prevent rattling at that point. This spring-connection is also of service when from any cause any one of the thill-coupling pins becomes accidentally lost out on the road, where it cannot be readily replaced, the spring-coupling serving as a temporary substitute therefor.

The torsion rods or springs may be of any suitable material—such as steel or wood. When steel is used, the lever-arms and the wrists thereon may be formed by simply bending the steel at right angles, or nearly so, substantially in the form shown; but when wood—such as second growth of ash or lance-wood—is employed for the torsion rods or springs, the arms and wrist-pins may be formed of malleable iron, wrought into the desired shape and provided with suitable angular arms, through which they can be firmly clamped to the free end of the torsion-rods. The bolsters to which the torsion rods or springs are attached are so shaped as to have a slight forward and backward elasticity, to permit the slight lengthening and shortening of the torsion-spring bars in action, and are connected with their axles in any usual way—the forward one by a fifth-wheel, in the ordinary manner, and the rear one, also, when the cross auxiliary perch is used; but as it may be sometimes preferred to use the ordinary perch as auxiliary to the torsion-spring perch, the rear axle will in such case be connected with its bolster rigidly or in any usual manner.

Having now described my invention, I claim as new—

1. In a road-wagon, the combined torsion-springs and perch, made each in the loop form shown, and in one piece with the arms connecting the same with the axle, the transverse connecting portion of one loop being provided with a guiding-loop for the torsion-rods of the other loop, substantially as described.

2. In a road-wagon, the torsion-rods E E', made in one piece, with the arms thereof connected to one and the same bolster or axle, in combination with the torsion-rods D and D', connecting with one and the same bolster or axle, and independently secured at their opposite ends upon either side of the rods E E', substantially as described.

3. The torsion-rods E E', made substantially in loop form, with the arms thereof connected to one and the same axle or bolster, and the torsion-rods D and D', having the arms thereof connecting with one and the same bolster or axle, said rods being independently secured at their opposite ends upon either side of the rods E E', and all of said torsion-rods serving the function of a perch, in combination with an auxiliary perch, substantially as and for the purpose described.

4. The combination, with the axles and the thills or draft attachment pivoted thereto, of a spring rigidly connected to the cross-bar and pivoted to the axle in line with the other pivotal connections therewith, and operating substantially as and for the purposes described.

5. In a road-wagon, the combination of the torsion-springs, the elastic bolsters, and the cross-perches constructed and arranged substantially as described.

In testimony whereof I have hereunto set my hand.

MOSES G. HUBBARD.

Witnesses:
JAS. W. SCHRACK,
D. D. HEAVNER.